(12) United States Patent
Le Saint et al.

(10) Patent No.: US 9,576,111 B2
(45) Date of Patent: *Feb. 21, 2017

(54) UNIFORM MODULAR FRAMEWORK FOR A HOST COMPUTER SYSTEM

(71) Applicant: ASSA ABLOY AB, Stockholm (SE)

(72) Inventors: Eric F. Le Saint, Los Altos, CA (US); John Jules Alexander Boyer, Ottawa (CA)

(73) Assignee: Assa Abloy AB, Stockholm (SE)

( * ) Notice: Subject to any disclaimer, the term of this patent is extended or adjusted under 35 U.S.C. 154(b) by 94 days.

This patent is subject to a terminal disclaimer.

(21) Appl. No.: 14/248,389

(22) Filed: Apr. 9, 2014

(65) Prior Publication Data

US 2014/0359301 A1  Dec. 4, 2014

Related U.S. Application Data

(63) Continuation of application No. 12/932,499, filed on Feb. 25, 2011, now Pat. No. 8,732,478, which is a continuation of application No. 11/939,444, filed on Nov. 13, 2007, now Pat. No. 7,921,298, and a
(Continued)

(51) Int. Cl.
| | |
|---|---|
| *G06F 21/60* | (2013.01) |
| *G06F 21/00* | (2013.01) |
| *G06F 21/12* | (2013.01) |
| *G06F 21/32* | (2013.01) |
| *G06F 21/34* | (2013.01) |

(Continued)

(52) U.S. Cl.
CPC ............. *G06F 21/00* (2013.01); *G06F 21/123* (2013.01); *G06F 21/32* (2013.01); *G06F 21/34* (2013.01); *G06F 21/57* (2013.01); *G06F 21/602* (2013.01); *H04L 63/0853* (2013.01); *H04L 63/20* (2013.01)

(58) Field of Classification Search
CPC ........ G06F 21/123; G06F 21/32; G06F 21/34; G06F 21/33; G06F 21/54; G06F 21/57; G06F 21/602; H04L 63/20; H04L 63/0853

See application file for complete search history.

(56) References Cited

U.S. PATENT DOCUMENTS 5,577,209 A * 11/1996 Boyle ................. G06F 21/6218
340/5.74
6,148,083 A * 11/2000 Fieres ................... G06F 21/602
380/255
(Continued)

*Primary Examiner* — Izunna Okeke
*Assistant Examiner* — Sher A Khan
(74) *Attorney, Agent, or Firm* — Muirhead and Saturnelli, LLC

(57) ABSTRACT

A security framework for a host computer system which allows a host to control access to a compliant security token by ensuring enforcement of established security policies administered by a middleware application. Processing between the host computer system and the security token is performed using one or more modular security application agents. The modular security application agents are counterpart applications to security applications installed in the security token and may be retrieved and installed upon to ensure compatibility between counterpart token and host security applications. The security policies are a composite of host security policies and token security policies which are logically combined by the middleware application at the beginning of a session.

20 Claims, 15 Drawing Sheets

Related U.S. Application Data continuation of application No. 10/425,028, filed on Apr. 29, 2003, now abandoned.

(51) Int. Cl.
*G06F 21/57* (2013.01)
*H04L 29/06* (2006.01)

(56) References Cited

U.S. PATENT DOCUMENTS

| | | | | |
|---|---|---|---|---|
| 6,230,271 B1* | 5/2001 | Wadlow | ............... | H04L 63/0227 726/1 |
| 6,484,261 B1* | 11/2002 | Wiegel | ............... | H04L 41/0856 715/763 |
| 6,513,721 B1* | 2/2003 | Salmre | ............... | G06F 8/34 235/381 |
| 7,024,689 B2* | 4/2006 | O'Donnell | ............... | G06F 21/10 707/999.001 |
| 7,111,321 B1* | 9/2006 | Watts, Jr. | ............... | G06F 21/34 705/50 |
| 7,426,642 B2* | 9/2008 | Aupperle | ............... | H04L 63/083 709/227 |
| 7,574,734 B2* | 8/2009 | Fedronic | ............... | G07C 9/00158 382/115 |
| 7,907,935 B2* | 3/2011 | Le Saint | ............... | G06F 21/31 455/411 |
| 7,921,288 B1* | 4/2011 | Hildebrand | ............... | H04L 63/04 713/165 |
| 8,316,051 B1* | 11/2012 | Burns | ............... | G06F 21/6227 707/694 |
| 2002/0141585 A1* | 10/2002 | Carr | ............... | H04L 29/06027 380/255 |
| 2003/0065942 A1* | 4/2003 | Lineman | ............... | G06F 21/577 726/4 |
| 2003/0084351 A1* | 5/2003 | Sugimoto | ............... | G06F 21/577 726/4 |
| 2003/0115039 A1* | 6/2003 | Wang | ............... | G06F 17/271 704/4 |
| 2003/0177389 A1* | 9/2003 | Albert | ............... | H04L 12/2856 726/1 |
| 2004/0111519 A1* | 6/2004 | Fu | ............... | H04L 63/0218 709/229 |
| 2004/0123153 A1* | 6/2004 | Wright | ............... | G06F 21/32 726/1 |
| 2004/0143730 A1* | 7/2004 | Wen | ............... | G06Q 20/3674 713/150 |
| 2006/0242685 A1* | 10/2006 | Heard | ............... | G06F 21/577 726/3 |
| 2007/0101405 A1* | 5/2007 | Engle | ............... | H04L 63/0272 726/4 |

* cited by examiner

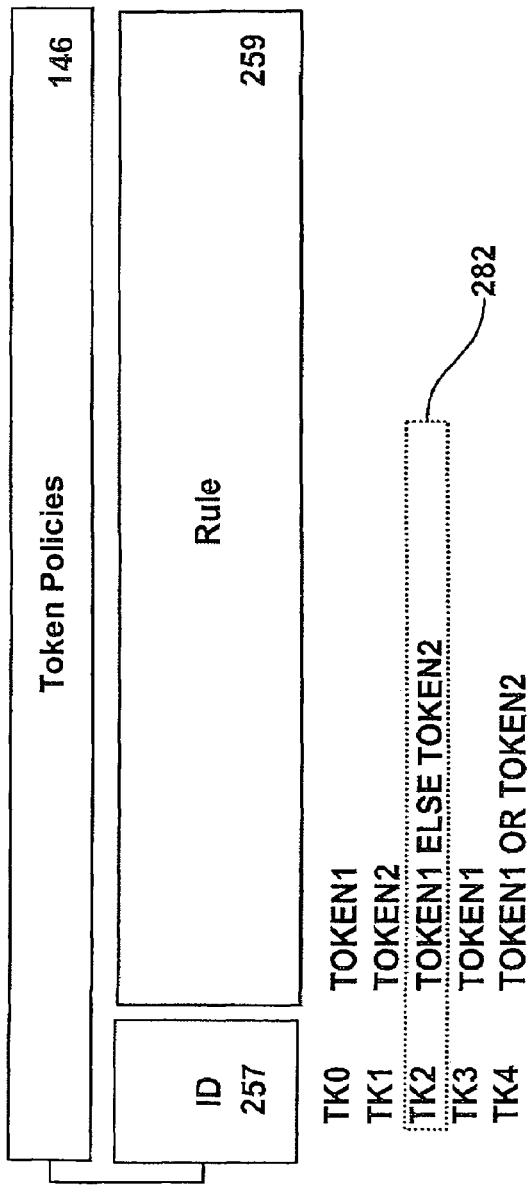
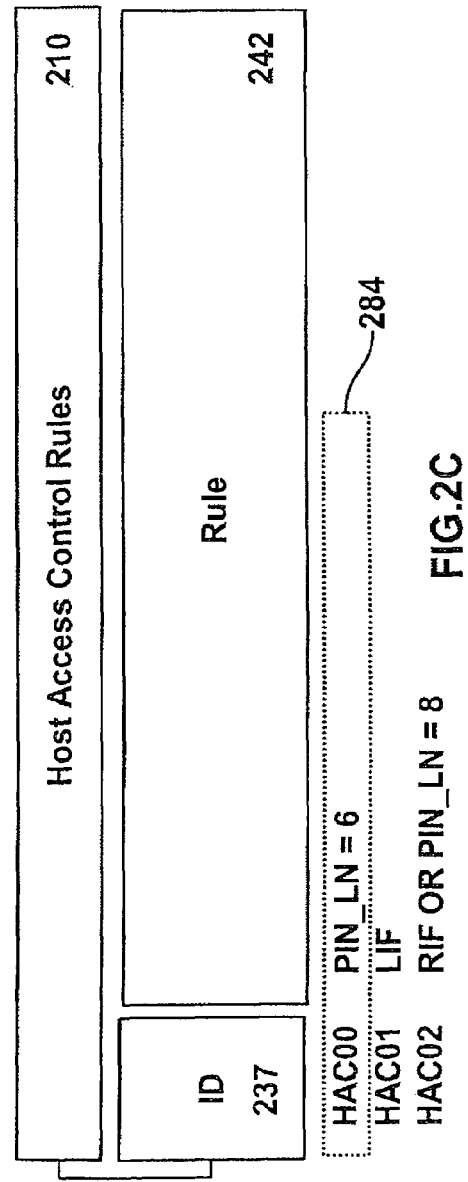

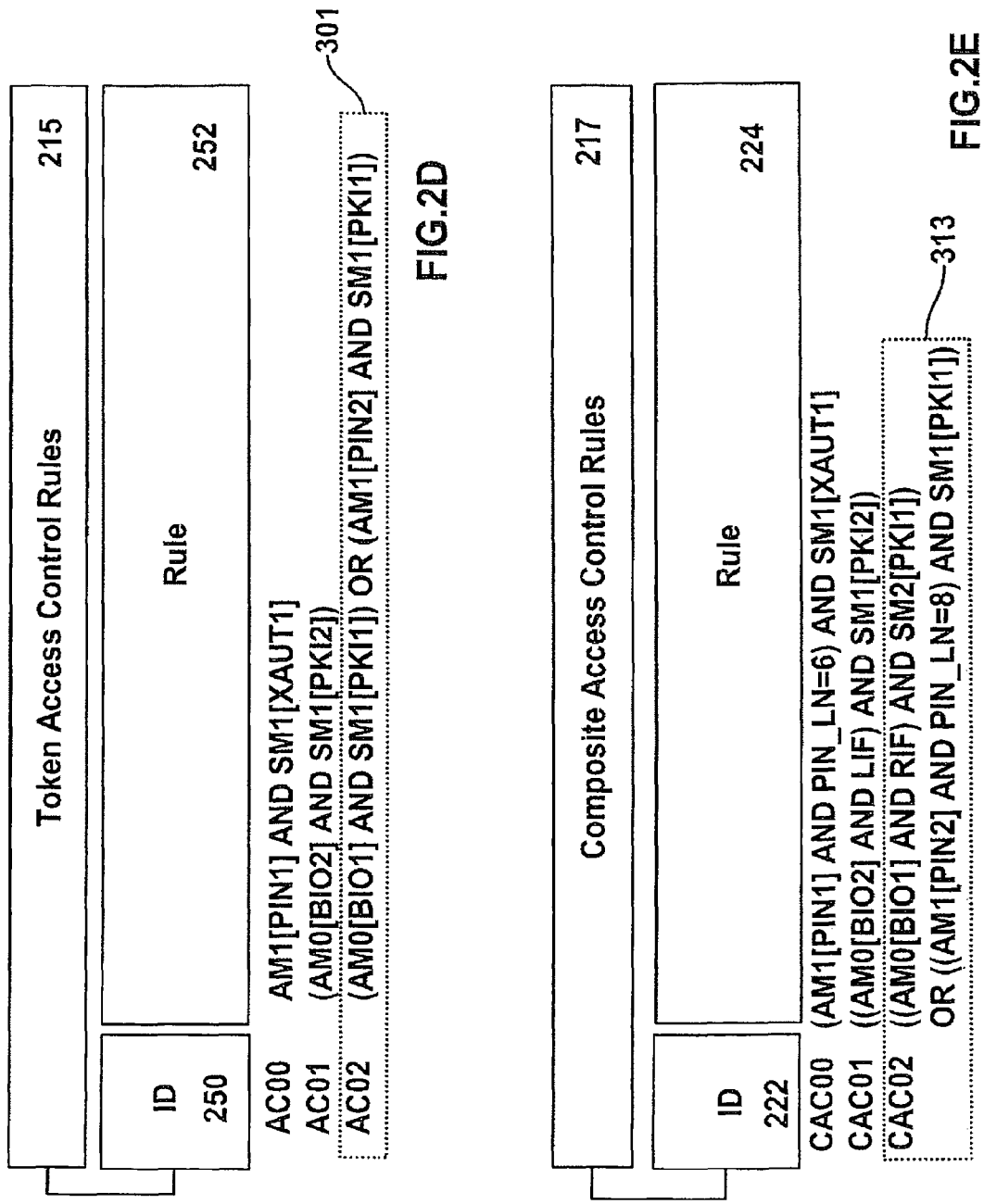

UNIFORM MODULAR FRAMEWORK FOR A HOST COMPUTER SYSTEM

CROSS-REFERENCE TO RELATED APPLICATIONS

This application is a continuation of U.S. application Ser. No. 12/932,499 filed Feb. 25, 2011 (pending), which is a continuation of U.S. application Ser. No. 11/939,444 filed Nov. 13, 2007, now U.S. Pat. No. 7,921,298, which is a continuation of U.S. application Ser. No. 10/425,028 filed Apr. 29, 2003, which are all incorporated herein by reference.

FIELD OF INVENTION

The present invention relates generally to a data processing system, method and computer program product and more specifically to a uniform security application framework for a host computer system in communication with a security token.

BACKGROUND

In the relevant art, host applications for supporting authentication and secure messaging functions involving the use of security tokens lack a uniform programming framework which has largely resulted in development of proprietary applications. The proprietary nature of these applications limits the ability to provide a uniform approach in the development and implementation of security applications. Vendors prefer to provide end-to-end solutions which generally work well with there own applications but are difficult to configure and maintain when combined with software and/or firmware provided by others.

Efforts to address interoperability of host security applications have focused primarily on resolving specific compatibility issues rather than providing a uniform programming framework in which to develop security applications. Little effort has been made to provide a standardized framework for a host computer system which allows applications developed by different providers to be installed without encountering interoperability issues. To date, the majority of attention has been focused on developing customized security token applications rather than on the host applications intended to interface with the security token applications.

For example, one vendor may excel at providing user authentication mechanisms using dynamic passwords while another may excel at providing certain types of biometric authentication mechanisms such as fingerprint reading, while another may excel at providing biometric iris scanning mechanisms.

However, in the relevant art it is generally difficult to mix vendor products due to compatibility issues and the non-modular nature of security applications deployed. While efforts have been made to standardize certain portions of the host security applications, the majority of host security applications available today intend to provide the entire solution rather than allowing a potential customer to pick and choose the most cost effective application(s) to meet a particular security requirement. The vendor's host security applications are specifically written to interface with the vendor's security token applications. Compatibility with other vendor products being of secondary importance.

Therefore, what is needed is a uniform host applications framework for deployment on a host computer system which allows interoperability of host security applications, allows modularization of host security applications and interfaces with security tokens having a compatible internal framework.

SUMMARY

This invention addresses the limitations described above and provides a uniform applications framework for host computers which supports modular host security application installations and allows independent operations of applications installed in the security token. In particular, proprietary biometric applications such as match on card technologies are decoupled from other host middleware applications and from the applications installed in the security token.

The term "security token" as defined herein refers to hardware based security devices such as security tokens, integrated circuit tokens, subscriber identification modules (SIM), wireless identification modules (WIM), USB token dongles, identification tokens, secure application modules (SAM), hardware security modules (HSM), secure multimedia token (SMMC), Trusted Computer Platform Alliance chip (TCPA), and like devices. Temporary virtual security tokens are included as well.

The term "credential" as defined herein refers to critical security parameters (CSP) such as authentication data, passwords, PINs, biometric templates, secret and private cryptographic keys and challenge/response messages or combinations thereof.

The term "parameter" as defined herein refers to a status flag, text, a number, arguments or an argument name assigned to a value that is passed from one routine to another or used as a means of customizing program operation which is broader than its normal context.

The invention comprises a system which provides a uniform security applications framework for a host computer system which cooperates with one or more compliant security tokens. The compliant security token(s) is in processing communications with the host computer system and includes a compatible uniform security framework which interfaces with the host security framework, a set of token security policies and one or more token security applications.

The host computer system includes a token access control application, token selection policies and several security application agents which are counterparts to the token security application(s). A set of host security policies associated with each of the security application agents is retrievably coupled to the token access control application.

The token access control application allows the retrieval of at least a portion of the token security policies from which a composite set of security policies is generated by logically combining the host security policies, token selection policies and the token security policies.

If the token access control application determines that a required security application agent and/or token security application is not present, the required applications may be downloaded and operatively installed from either a local or a remote storage location as individual modules without disruption of existing dependencies.

In one embodiment of the invention, ensuring enforcement of the composite set of security policies is performed by the token access control application. In this embodiment of the invention, the token access control application further includes the ability to receive a credential, cause at least one of the security application agents to execute in response to an access request and the ability to send a credential to the appropriate security application agent.

In a second embodiment of the invention, ensuring enforcement of the composite security policies is performed by the applicable security application agents which receive the composite security policy from the token access control application. In this embodiment of the invention, a hierarchy exists between security application agents which causes the required security application agents to execute sequentially in accordance with the applicable portion of the composite set of security policies. In this embodiment of the invention, credentials are sent directly to the appropriate security application agent.

In yet another embodiment of the invention, the responsibility for ensuring enforcement of the composite set of security policies is performed by a calling application. In this embodiment of the invention, the token access control application generates the composite security policies and forwards them to a calling application. The calling application then sequentially causes the required security application agents to execute sequentially in accordance with the applicable portion of the composite set of security policies. In this embodiment of the invention, credentials are forwarded to the appropriate security application agent by the calling application.

In all embodiments of the invention, the security application agents include the ability to perform a security function with one or more counterpart token security applications in accordance with the composite set of security policies and return objects in which a security function is performed by a token application. The security application agents may exist as separate applications, dynamically linked libraries associated with the token access control application or any combination thereof.

In another embodiment of the invention, the composite set of security policies includes token access control rules, host access control rules, token selection rules and composite access control rules but lacks a registry. In this embodiment of the invention, an operating system installed on the host administers the security application agents.

In yet another embodiment of the invention, a local registry is included which is administered by the token access control application. The local registry is comprised of enablement flags and operational states related to authentication, secure messaging and application enablement. Each available application requires a corresponding entry in the registry including registered token security applications and registered security agent applications.

The token security applications includes a token security domain control application, a token services application, a token administrative services application and a token security services application. The token security services application includes the ability to perform authentication and secure messaging. The token services application includes the ability to perform cryptography, return objects in which a security function was performed to a security agent application. The object includes a credential, a digital certificate, data to undergo a cryptographic function or data to be stored in said security token.

Processing by the uniform security framework involves the following steps:

a. receiving a token security function request from a requesting application,
b. retrieving token selection policies,
c. retrieving a set of token security policies,
d. retrieving a set of host security policies,
e. combining the token security policies, the host security policies and the token selection policies into a composite security policy,
f. ensuring enforcement of said composite security policy on the security function request,
g. receiving a credential if required by the composite security policy,
h. sending the credential to an appropriate security application agent if required by the composite security policy,
i. sending the credential to an appropriate token security application if required by the composite security policy, and
j. performing a security function in accordance with the composite security policy.

In an alternate embodiment of the invention which includes a registry, step d. includes the steps of;
i.) verifying a plurality of enablement states in a registry,
ii.) verifying at least one authentication state in the registry,
iii.) verifying a secure messaging state in the registry,
iv) verifying that at least one counterpart pair of a token security application and host security application agent are operatively installed, and
v) retrieving and operatively installing a missing component of the counterpart pair from either a local or a remote storage location.

The invention also provides for retrieval of compatibility information related to one or more counterpart security application agents from a functionally connected security token by at least one security application installed on a host computer system wherein the retrievable capability information relates to compatibility between the one or more counterpart security application agents and the one or more token security applications. The at least one security application includes functionality for;

retrieving the compatibility information related to the one or more counterpart security application agents;

verifying that at least one compatible counterpart security application agent is operatively installed and if not, retrieving and operatively installing at least one compatible counterpart security application agent.

The at least one security application includes either a security application installed in a middleware services layer or is a token access control application retrieved from either a local or remote storage location.

Installation of the retrieved at least one compatible counterpart security application agent is accomplished by entering one or more parameters associated with the at least one compatible counterpart security application agent in a registry.

The at least one compatible counterpart security application agent is a modular software application which can be added, removed or replaced without disruption of any existing dependencies by changing the one or more parameters in entered in the registry.

The retrieval of compatibility information related to one or more counterpart security application agents from a functionally connected security token by at least one security application installed on a host computer system is accomplished by performing the steps of:

a. retrieving compatibility information related to one or more counterpart security application agents from a security token,
b. verifying that at least one compatible counterpart security application agent is operatively installed on a host computer system, and if not,
c. retrieving at least one compatible counterpart security application agent,
d. performing a signature verification process and allowing installation if successful, or aborting the installation if unsuccessful, e. operatively installing said at least one compatible counterpart security application agent on said host computer system, and f. entering one or parameters associated with said at least one compatible counterpart security application agent into a registry.

The programs and data may be placed onto transportable medium such as a CD ROM, floppy disk, data tape, portable hard disk, flash memory device or DVD for installing on a host computer system.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

FIG. 2B—is a detailed block diagram illustrating token selection policies and rules.

FIG. 2C—is a detailed block diagram illustrating host access control policies and rules.

FIG. 2D—is a detailed block diagram illustrating token access control policies and rules.

FIG. 2E—is a detailed block diagram illustrating a composite set of access control rules derived from the logical combination of host and token access control rules.

DETAILED DESCRIPTION

This present invention provides a uniform host application framework which separates authentication and secure messaging functions into modular security applications, allows interoperability of host security applications and interfaces with security tokens having a compatible internal framework. The invention further allows selection of individual security tokens to perform selected security tasks administered by token selection policies.

The invention has the added features of providing a more uniform security application programming interface which improves overall interoperability of security applications, simplifies security application development and provides application level management and enforcement of security policies. The applications are envisioned to be programmed using high level programming languages such as Java™, Visual Basic™, C++ or C.

Figure 1:
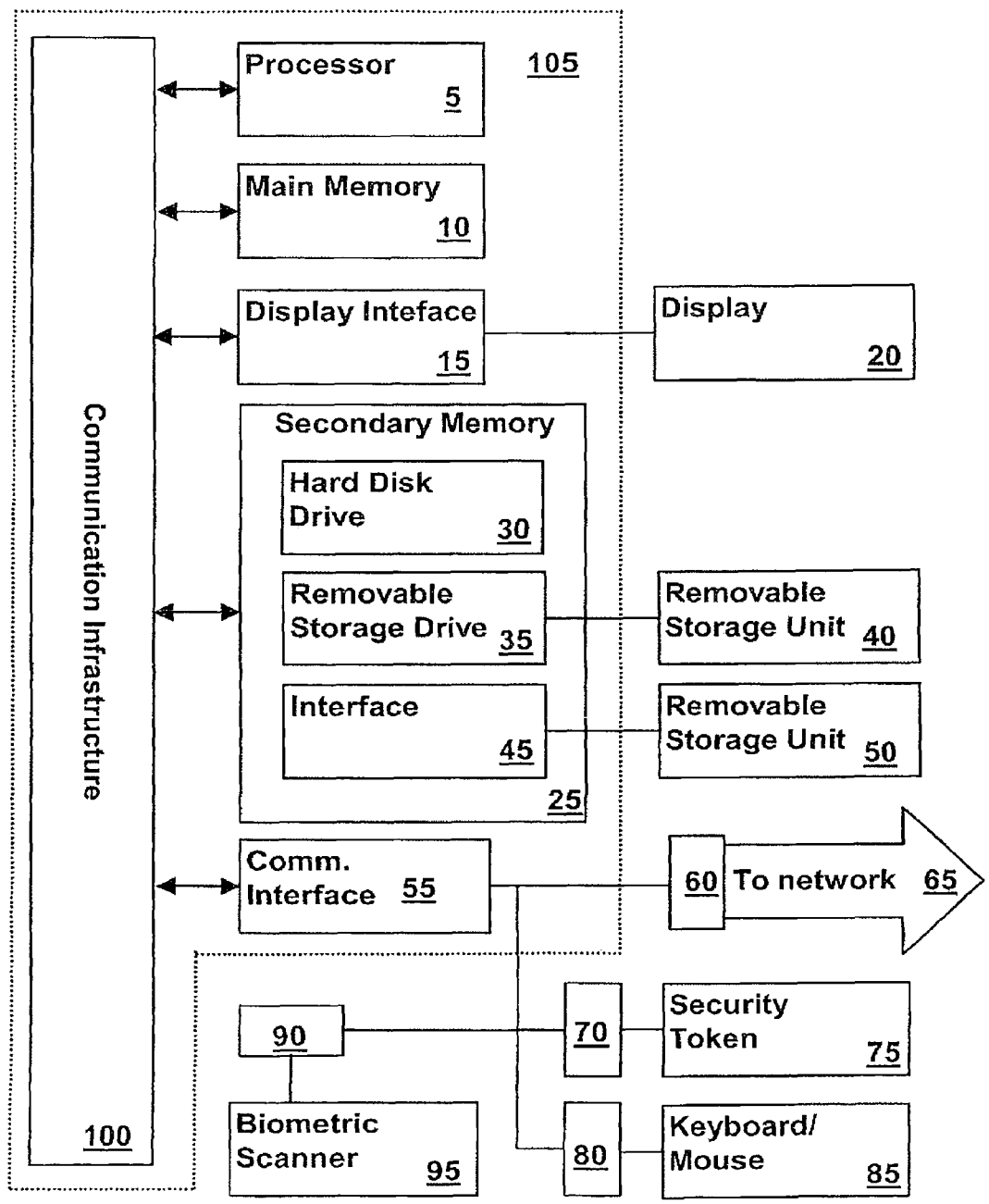
FIG. 1—is a generalized block diagram of a host computer system and a electromagnetically connected security token.

Referring to FIG. 1, a typical host computer system 105 is shown which includes a processor 5, a main memory 10, a display 20 electromagnetically coupled to a display interface 15, a secondary memory subsystem 25 electromagnetically coupled to a hard disk drive 30, a removable storage drive 35 electromagnetically coupled to a removable storage unit 40 and an auxiliary removable storage interface 45 electromagnetically coupled to an auxiliary removable storage unit 50.

A communications interface 55 subsystem is coupled to a network interface 60 and a network 65, a security token interface 70 and a security token 75, a user input interface 80 including a mouse and a keyboard 85, a biometric scanner interface 90 and a biometric scanner 95.

The processor 5, main memory 10, display interface 15, secondary memory subsystem 25 and communications interface system 55 are electromagnetically coupled to a communications infrastructure 100. The host computer system 105 includes an operating system, a token access control application (TACA) and associated middleware security agent application agents, one or more applications requiring security services from a security token 75, cryptography software capable of performing symmetric and asymmetric cryptographic functions, secure messaging software and device interface software. Data necessary to support the security functions should be assumed to be present as well.

The security token 75 includes a wireless and/or electrical connection means compatible with the security token interface 70, a processor, volatile and non-volatile memory electromagnetically coupled to the processor, a runtime operating environment, cryptography extensions incorporated into the operating system and capable of performing symmetric and asymmetric cryptographic functions compatible with the host cryptography software, a security domain access control application (SDCA) and associated security applications, one or more credential protected applications functionally coupled to the security executive application and a public key infrastructure (PKI) key pair functionally coupled to the security executive application. Data necessary to support the security functions should be assumed to be present as well. The non-volatile memory has operatively stored therein one or more reference credentials which are verified by the security applications to allow access to the one or more credential protected applications.

Figure 1A:
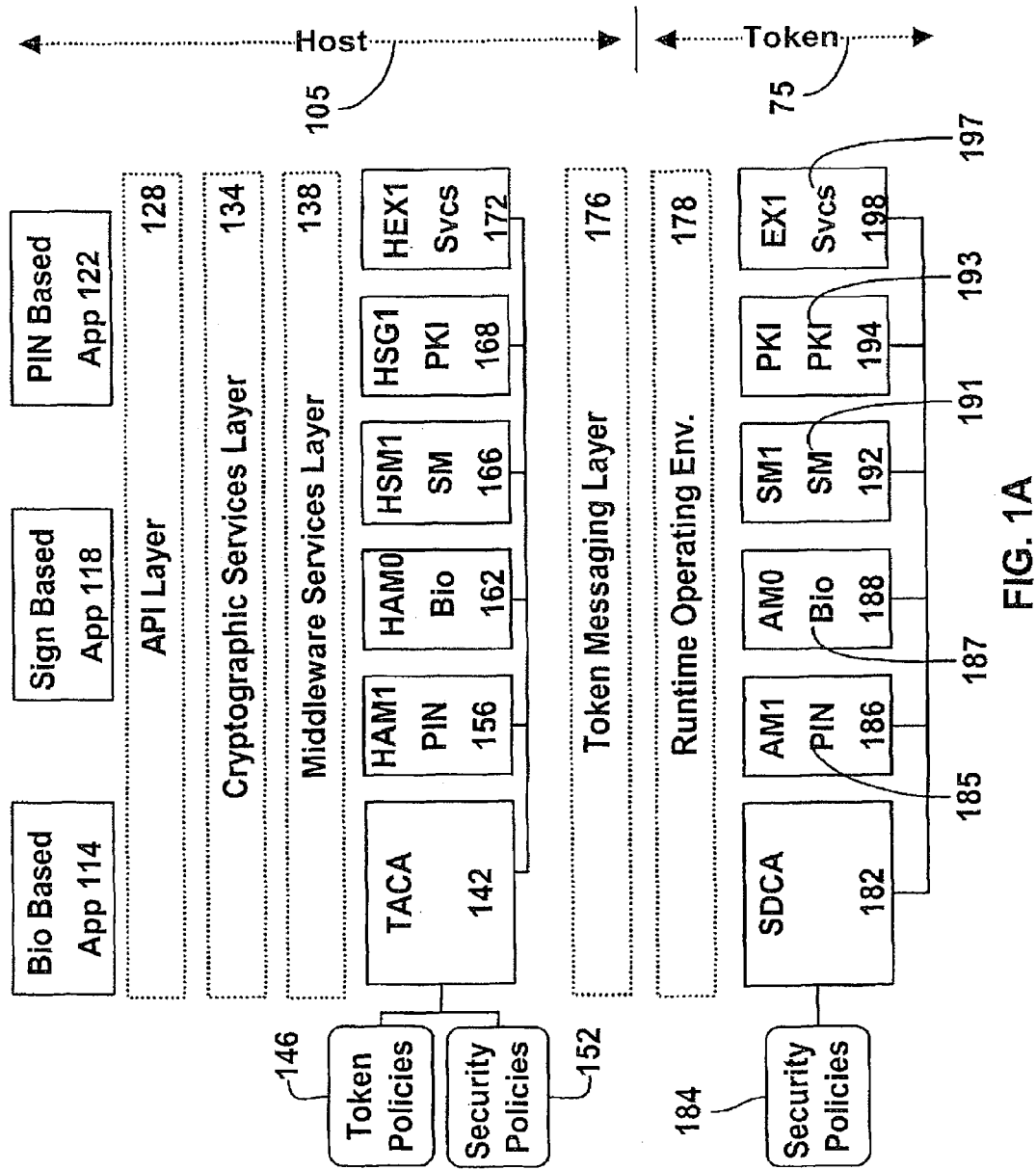
FIG. 1A—is a detailed block diagram invention illustrating the relationship and arrange of various applications employed in the invention.

FIG. 1A depicts the invention and associated host applications and resources. A plurality of security applications for example, a biometric based application 114, a signing based application 118 and an authentication based application which uses a personal identification number (PIN) 122. The security applications are coupled to an applications programming interface (API) layer 128. The API layer includes a set of routines used by the application program to direct the performance of procedures by the host's operating system. The API layer 128 is shown in dotted lines to indicate that no substantial changes are made to the functionality of this layer. The API layer 128 rides above a cryptographic services layer 134.

The cryptographic services layer 134 allows access to host cryptographic resources and acts as a gateway to a middleware services layer 138. The middleware services layer 138 routes requests for token services sent by the host applications 114, 118, 122 to a token access control application (TACA) 142. The middleware services layer 138 is intended to provide a consistent and modular application interface between the security applications 114, 118, 122 and the token access control application (TACA) 142 and in an alternate embodiment of the invention, maintains security application agent module consistency with their counterpart security applications 186, 188, 192, 194, 198 installed inside the security token 75.

The TACA 142 is associated with a set of token security policies 146 that controls which security token will perform a specific type of security transaction when a plurality of security tokens are available to perform the transaction.

The TACA 142 is also associated with a set of host security policies 152 which controls a security function of one or more security application agents 156, 162, 166, 168, 172 and in one embodiment of the invention, maintains security application agent module consistency with their counterpart security applications 186, 188, 192, 194, 198 installed inside the security token 75.

The security application agents 156, 162, 166, 168, 172 may exist as separate applications, dynamically linked libraries associated with the token access control application or any combination thereof. Both the security application agents 156, 162, 166, 168, 172 and token security applications 186, 188, 192, 194; 198 are modular in nature and may be retrieved locally if available on a local hard drive or downloaded from a centralized repository and dynamically installed without disruption of existing dependencies, which is a central concept of the uniform modular framework. The uniform modular framework being comprised of the API layer 128, cryptographic services layer 134, middleware services layer 138, token access control application 142, token messaging layer 176, token runtime operating environment 178 and security domain control application 182.

In one embodiment of the invention, the TACA, ensures enforcement of the security policies. In another embodiment of the invention, the appropriate security application agents 156, 162, 166 receives the security policies from the TACA and self enforces the security policies. In a third embodiment of the invention, the TACA sends the security policies to the requesting application which ensures enforcement of the security policies.

The security application agents 156, 162, 166, 168, 172 are designed to perform a security function in conjunction with their counterpart security applications 182, 186, 188, 192, 194, 198 installed in the security token 75. The security application agents functionally decouples security applications installed on the host from those applications installed in the security token, allowing greater interoperability between host applications and security token applications and is part of the modular plug-in architecture.

This allows the security application agents and their counterpart token security applications to act in concert with a middleware security application but functionally independent from the middleware security application.

A typical arrangement of security application agents includes a PIN agent 156, a biometric agent 162, a secure messaging agent 166 and a public key cryptography agent 168. Additional agents may be installed to perform other functions as is shown by the other agent 172. In another embodiment of the invention, administrative control of the security application agents 156, 162, 166, 168, 172 remains with the operating system installed on the host. A token messaging layer 176 provides communications protocol conversion into ISO 7816 compliant application protocol data unit (APDU) format. Addressing of the counterpart token security applications may be accomplished explicitly using traditional APDU messaging or implicitly by remote method invocation (RMI) both of which are supported by the JCRE version 2.2. The "Java Card™ 2.2 Runtime Environment (JCRE) Specification," is included as a reference to this specification.

A security token 75 includes a security domain control application (SDCA) 182 coupled to a runtime operating environment 178 and a set of token security policies 184. The token security policies control a security function associated with a PIN application 186, a biometric application 188, a secure messaging application 192, a PKI cryptography application 194 and an additional application 198. The token security applications 186, 188, 192, 194, 198 each includes information 185, 187, 191, 193, 197 which is used by the middleware services layer 138 to determine if the proper counterpart security application agent(s) 156, 162, 166, 168, 172 is installed.

This information is transferred along with the token security policies and is used by the middleware services layer 138 for security application agent version control and security application agent module loading. The operation of the token security applications and SDCA is described in co-pending U.S. application Ser. No. 10/321,624 to Eric Le Saint & al., entitled "Uniform Framework for Security Tokens" and filed on Dec. 18, 2002

Figure 1B:
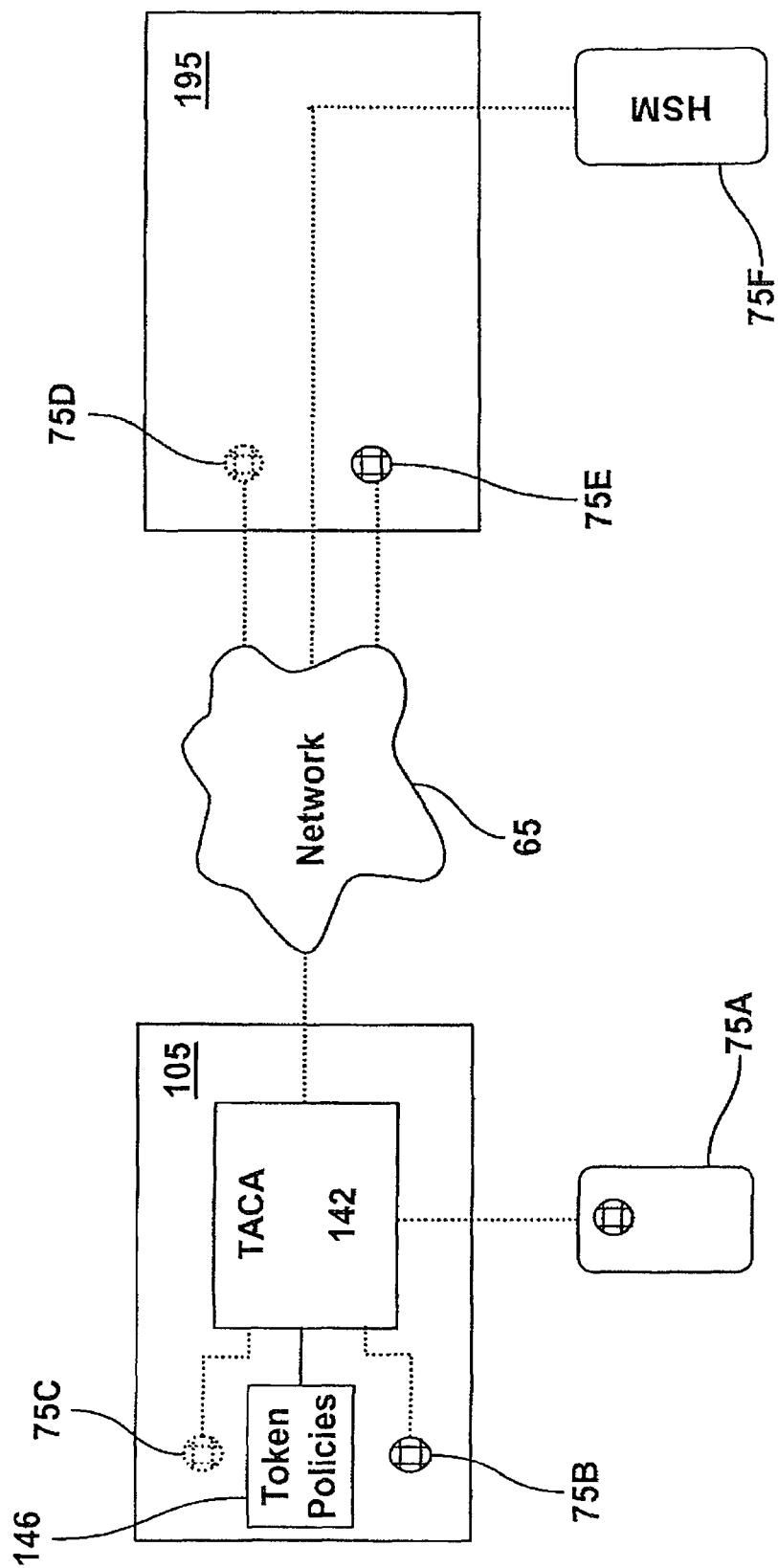
FIG. 1B—is a detailed block diagram illustrating a plurality of available security tokens for implementing the invention.

Referring to FIG. 1B, an embodiment of the invention is shown where several security tokens are available to perform one or more security transactions. The security tokens include a traditional smart card 75A, a Trusted Computer Platform Alliance (TPCA) chip 75B, a local virtual security 75C, a remote virtual security 75D, a remote TPCA chip 75E or a hardware security module (HSM) 75F. The token access control application (TACA) 142 selects the appropriate security token in which to process a security transaction based on criteria included in the Token Policies 146. One or more of the security tokens may be employed to complete a security transactions.

For instance authentication may be performed using a local virtual security token 75C installed in the host 105 and a remote virtual security token 75D installed in a remote server 195 connected by a network 65 may be used to establish secure messaging.

Figure 1C:
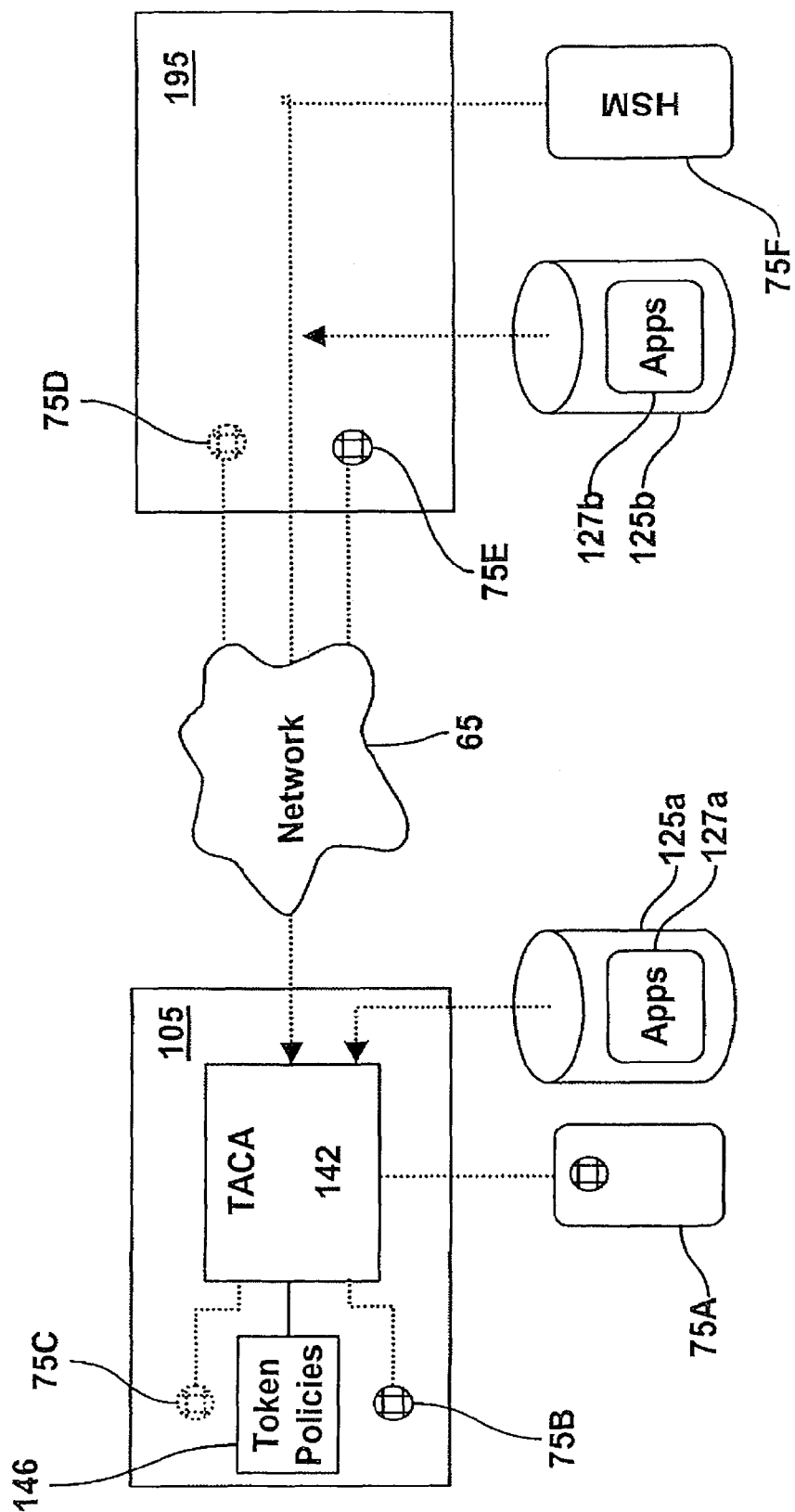
FIG. 1C—is a detailed block diagram illustrating retrieval and installation of a security application agent or a token security application.

Referring to FIG. 1C, if upon generating a composite security policy, the TACA 142 or middleware services layer 138 determines that a required security application agent either not present or incompatible with a token security application, the application agent 127a may be securely retrieved from a local storage location 125a or the application 127b may be downloaded a remote storage location 125*b* and installed in the applicable location(s). Upon installation, the new application is registered in either a registry table maintained by the host operating system or a separate registry table maintained by the TACA 142 described below. An optional code authentication may be performed by comparing digital signatures before installation and registration is performed.

Figure 2:
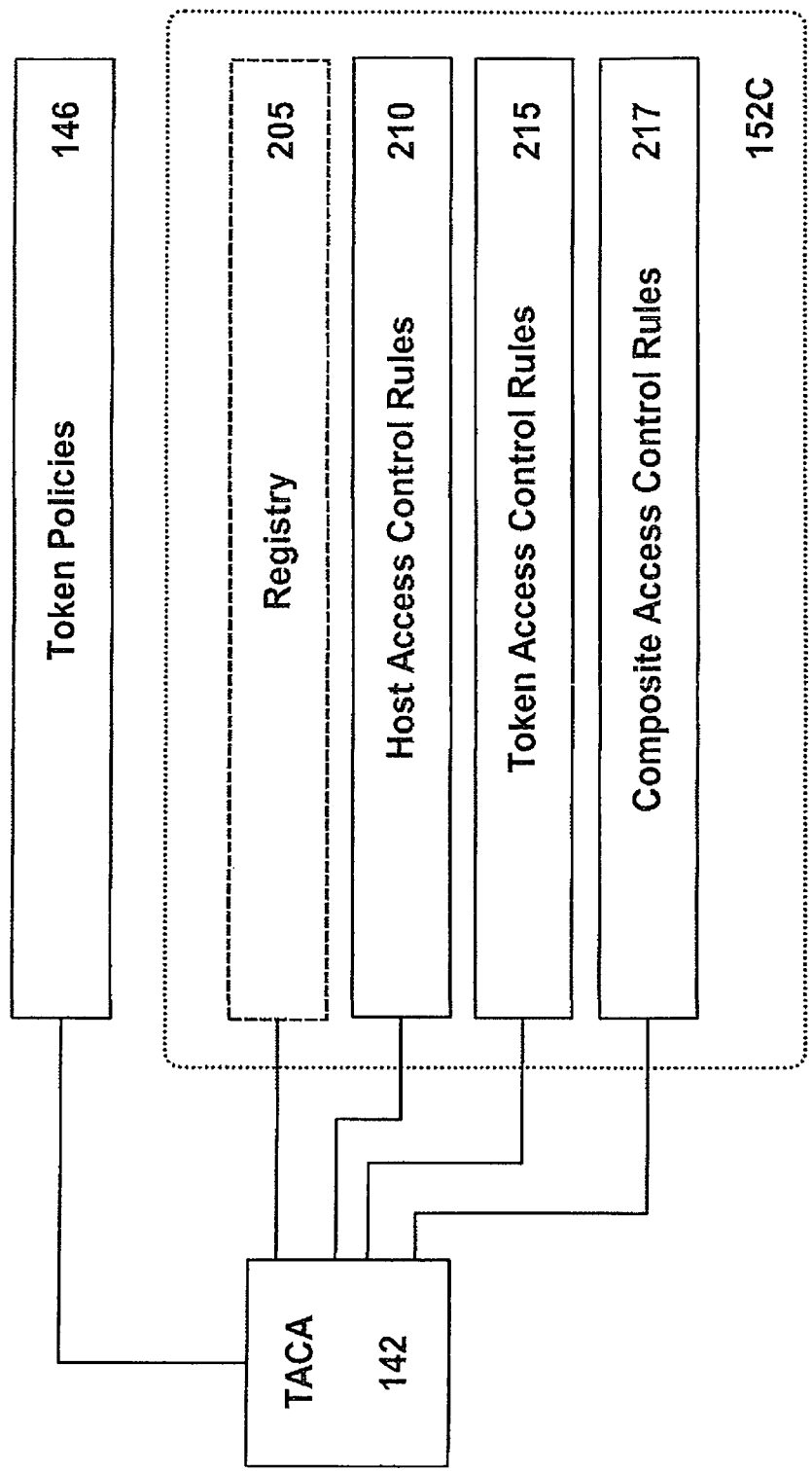
FIG. 2—is a detailed block diagram illustrating the functional relationship between a token access control application (TACA) and associated security and token policies.

In FIG. 2, a relationship between the TACA 142, host security policies 152 and token security policies 146 is provided. In one embodiment of the invention, the composite security policies 152C include a set of logic based host access control rules 210, a set of logic based token access control rules 215 and a composite set of access control rules 217 derived from the logical combination of the host access control rules 210 and the token access control rules 215. The composite security policies 152C may be stored locally on the host or stored remotely on a security server and retrieved by the host TACA 142. In an alternate embodiment of the invention, a local registry 205 (shown in dashed lines) is included.

The local registry is administered by the TACA 142 and provides additional administrative controls over the security application agents. The token policies 146 are likewise based on logic based rules and may be stored locally on the host or stored remotely on a security server and retrieved by the host TACA 142 as well. In the embodiment of the invention including a registry, entries are included to designate which security token(s) are to perform specific security transactions.

Figure 2A:
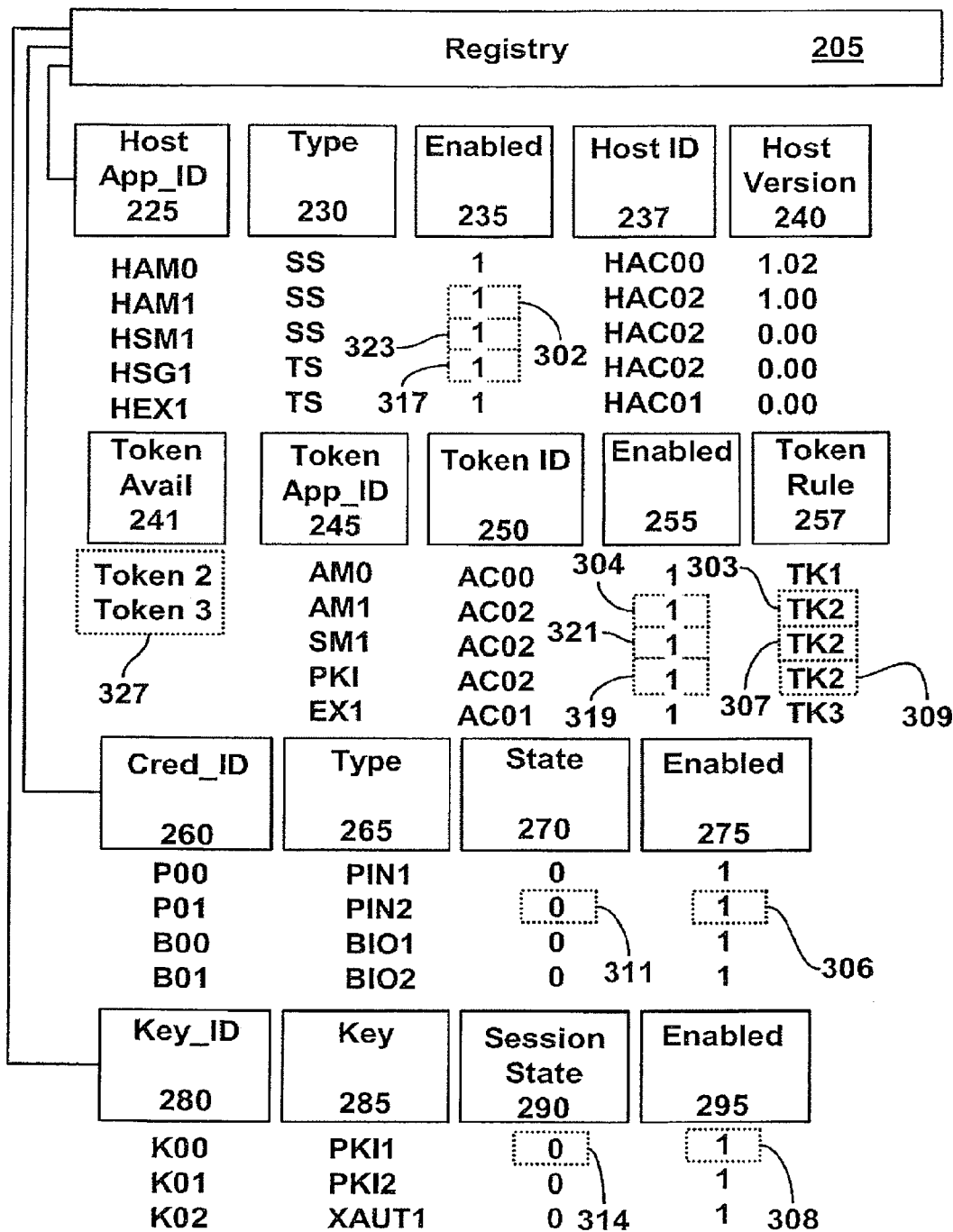
FIG. 2A—is a detailed block diagram illustrating an embodiment of the invention which uses a registry having an associated with the security policies.

Referring to FIG. 2A, the embodiment including a local registry administered by the TACA is depicted. The local registry is comprised of a set of unique identifiers (Host App_D) 225 for the available security application agents and a set of security type (Type) indicators 230 for the security application agents.

The security type divides the security application agents into two broad categories including security services (SS) such as authentication and secure messaging and token services (TS) such as signing and secure storage of information. The local registry may either be stored on the host computer system 105 or retrieved from a remote source, for example a server.

A set of enablement status flags (Enabled) 235 is provided which allows for administrative control over the security application agents. Activation and inactivation of the security application agents is accomplished by changing the status flag value. In this example, 1 indicates an active state while a 0 would indicate an inactive state.

Another set of unique identifiers (Host ID) 237 is included for the host access control rules. These entries provide a relational link to a table or equivalent data structure which includes the specific access control rule identified in the registry. A set of security application agent versions 240 are retained inside the registry and checked by either the TACA 142 or middleware services layer 138 shown in FIG. 1A, to ensure that the proper version of the security application agent is operatively installed. If the required version is not present, it may be retrieved and installed as described above in FIG. 1C. Upon installation, the required entries are included in the registry. The registry table is part of the modular framework which allows changes to available security application agents without disruption of existing dependencies.

A list 241 of available tokens is provided and updated by the TACA. A counterpart set of unique token application identifiers (Token App_ID) 245 is provided for available security applications installed in one or more available security tokens. The security token entries included in the registry are obtained either by directing a request to a specific security token or returned automatically by the token messaging layer 176 shown in FIG. 1A.

A set of unique identifiers (Token. ID) 250 is likewise provided for the token access control rules. These entries are retrieved from the security policies included in a security token by the security domain control application (SDCA) 182 shown in FIG. 1A. A set of enablement status flags (Enabled) 255 is provided which accomplishes the same administrative functions for the token security applications as described above for the security application agents.

Another set of unique identifiers (Token Rule) 257 is provided for the token selection rules. These entries may be administratively defined or determined using information received from the token interface layer 138 shown in FIG. 1A.

A set of unique identifiers codes (Cred_ID) 260 is provided for the credentials required by one or more active security tokens. In this example, P refers to PIN, while B refers to biometric type credentials. These codes are referred to by the access control rules to specify which credential is required for a specific transaction. To simplify administration, an additional set of credential type indicators (Type) 265 is provided for each credential type.

A set of authentication states (State) 270 associated with each of the credentials is provided. The authentication states are checked by the TACA during enforcement of a required security policy. In this example, a value of 0 indicates that no successful authentication has occurred within the current session for the particular credential.

A value of 1 indicates that a successful authentication has occurred within the current session for the particular credential. A set of enablement status flags (Enabled) 275 is provided for each credential which accomplishes the same administrative functions as described above.

A set of unique cryptographic key codes (Key_ID) 280 for each cryptographic key included in the active security tokens is provided. These codes are referred to by the access control rules to specify which key is to be used in a specific transaction. To simplify administration, an additional set of key type indicators (Key) 285 is provided. In this example, PKI refers to a public key infrastructure key while XAUT refers to a symmetric type key.

A set of secure messaging session flags (State) 290 associated with each of the cryptographic keys is provided. The session states are checked by the TACA during enforcement of a required security policy. In this example, a value of 0 indicates that no active session has been established during the current session. A value of 1 indicates that an active session is established during the current session using a particular cryptographic key. A set of enablement status flags (Enabled) 295 is provided for each cryptographic key which accomplishes the same administrative functions as described above.

The secure messaging session state 290 and secure messaging application enablement flag 295 are automatically transferred from the SDCA to the TACA upon insertion of the security token into a hardware interface with the host, upon a first attempted access of the security token or provided automatically from the token interface layer 138 shown in FIG. 1A Once the necessary information is retrieved, the token access control application (TACA) verifies the state and enablement status locally rather than retrieving the security parameters from the associated security token.

This limits the amount of data sent to and from the security token(s) thus improving performance. Overall, system security remains unaffected as a change in a security state in the local registry does not necessarily reflect the controlling security state of the security token.

FIG. 2B depicts the token policies 146 retrieved by the TACA. The token selection rules are comprised of a unique identifier (ID) 257 for each rule and the actual rules (Rule) 259 themselves. All access control rules as well as the token selection rules utilize standard Boolean, logic operators and logic statements including AND, OR, NOT, ELSE, IF, XOR. In addition, standard arithmetic statements including <, >, <>, =, +, − may be used as well. Rule TK2 282 translates simply to use token1 if available, otherwise use token2. As an example, this arrangement allows the first use of a virtual token which is considerably faster than a hardware based token.

FIG. 2C depicts the host access control rules 210 included in the host security policies. The host access control rules are comprised of a unique identifier 237 for each rule and the actual host access control rules 242. Rule HAC00 284 translates to receiving a personal identification number (PIN) being 6 characters in length. The abbreviations LIF, RIF refer to biometric inputs of left index finger and right index finger. The host security policies can be generated from an aggregation of policies gathered from multiple sources such as a user, security application, group usage policy, security domain, the particular workstation, etc. The host security policies may be stored on the security token, in the local registry, or remotely on a server or remote data base or any combination thereof.

FIG. 2D depicts the token access control rules 215 included in the token security policies received from one or more active security tokens. The token access control rules are comprised of a unique identifier 250 for each rule and the actual token access control rules 252.

Rule AC02 301 translates to use authentication application AM0 which requires a biometric input BIO1 or use authentication application AM1 which requires a credential PIN2 and a secure messaging session using secure messaging application with cryptographic key PKI1.

FIG. 2E depicts the composite access control rules 217 generated by the TACA. The composite access control rules are comprised of a unique identifier 222 for each rule and the actual composite access control rules 224. The composite access control rules 224 are generated by logically combining the token access control rules and host access control rules.

Combined rule CAC02 313 was generated by the TACA from the logical combination of host access control rule HAC00 284 with token access control rule AC02 301 and translates to use authentication application AM0 with biometric input BIO1 and receive a right index finger (RIF) input and establish a secure messaging session using secure messaging application SM2 using cryptographic key PKI1. As an alternative, use authentication application AM1 and receive a PIN having a length of eight characters and establish a secure messaging session using secure messaging application SM1 using cryptographic key PKI1.

The composite access control may then be combined with the token selection rule TK2 282 which requires a first use of token1 if available, otherwise use token2. In all cases where token selection rules, token access control rules and host access control rules address a specific security requirement, the most restrictive rule is adopted for the composite access control rule.

Figure 3:
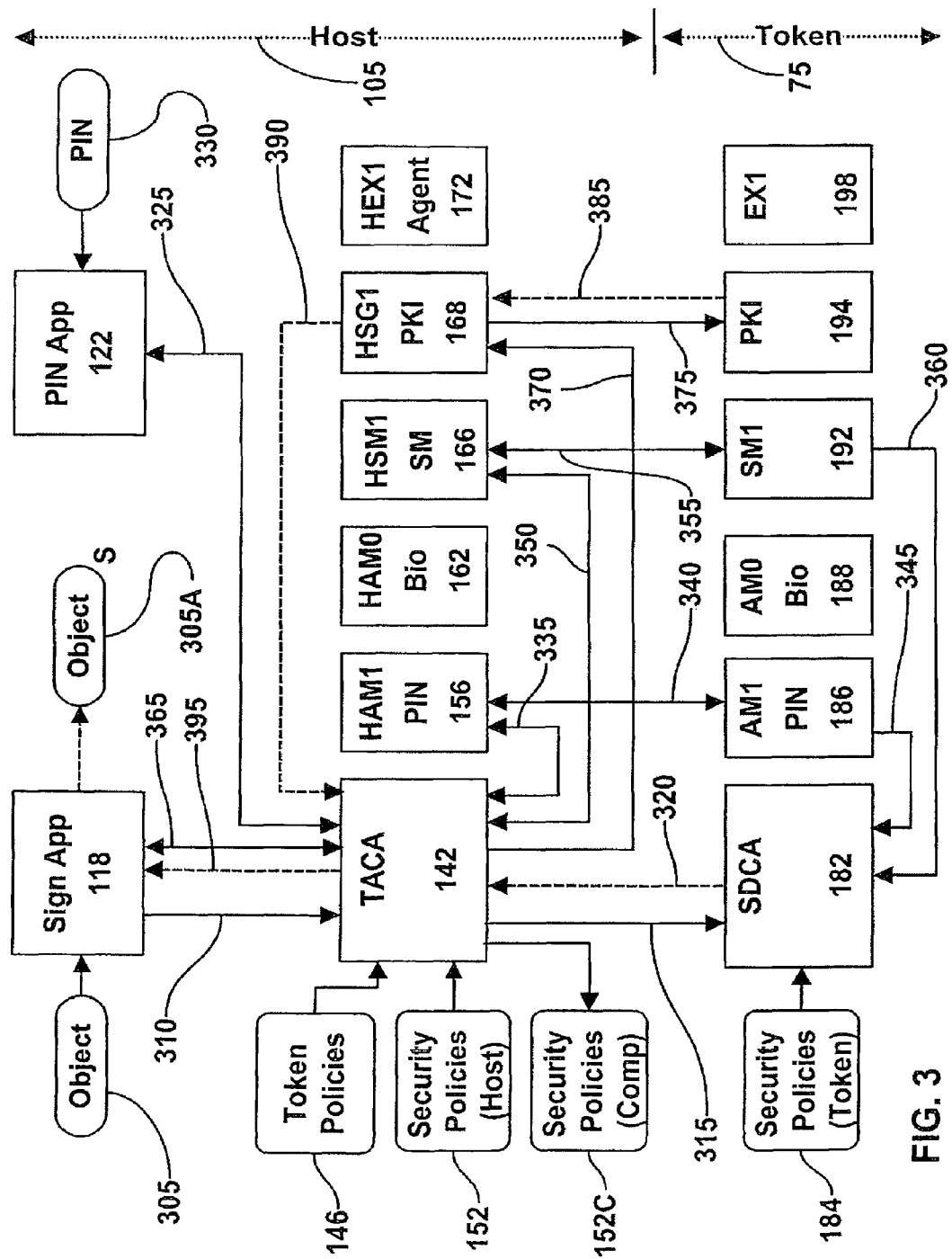
FIG. 3—is a detailed block diagram illustrating a first embodiment of the invention.

FIG. 3, depicts an example implementation of one embodiment of the invention where a requesting application 118 requests an object 305 to be signed by a PKI cryptography application 194 included in an associated security token 75. The requesting application 118 sends a request 310 to the token access control application (TACA) 142 which causes the TACA to request 315 the token security policies 184 from the token's security domain control application (SDCA) 182 and retrieves the token policies 146 for proper token selection.

The token security policies are returned 320 to the TACA 142 and logically combined with the host security policies 152 resulting in a set of composite security policies 152C. In an alternate embodiment of the invention, information related to the required counterpart security application agents is returned as well for verification and if necessary installation. The TACA 142 applies the composite security policies for signing the object 305. Depending on the embodiment of the invention (registry embodiment), the security parameters associated with the security token may be passed as well to the TACA. The operation of one embodiment of the invention is shown by way of example.

Referring back to. FIG. 2E, a composite security policy CAC02 313 requires a user to authenticate using token authentication application AM1 186 by entry of a personal identification number (PIN) 330 having a pin length of 8 characters and establishment of a secure messaging session using token application SM1 192 before allowing access to the token signing application (PKI) 194.

The applicable portion of the composite security policy implemented is CAC02 (AM1[PIN2] AND PIN_LN=8) AND SM1[PKI1] and token selection rule TK2 282 requires a first use of TOKEN1 if available, otherwise use TOKEN2.

Referring back to FIG. 2A, the requirements of the composite security policy CAC02 313, token selection rule TK2 282 and the required local security states must be verified by the TACA 142 before a security function is allowed using a designated security token. The TACA 142 verifies that the required enablement status flags are set to true (1) 302, 323, 317 for the required host application agents, (Enabled) 235, verifies that the required enablement status flags are set to true (1) 304, 319, 321 for the token security applications (Enabled) 255, verifies that the required enablement status flags are set to true (1) 306 for the credentials (Enabled) 275 and verifies that the required enablement status flags are set to true (1) 308 for the cryptographic keys (Enabled) 295.

If any of the required enablement flags are not set to the proper value an error is returned and processing ends. The TACA 142 also checks the flag 311 for the current authentication state (State) 270 and session state flag 314 for secure messaging (Session State) 290. If either or both of these states meet the required composite security policy, the portion or all of the policy meeting the requirements may be bypassed to improve operational performance.

In addition, TACA also determines which security tokens to perform the authentication and secure messaging functions using token selection rule TK2 282. Based on the determination 327, TOKEN 1 is not available, therefore TOKEN 2 will be used to perform the security transactions.

In the local registry, all of the required enablement states are shown with the proper values 302, 304, 306, 308, 317, 319, 321, 323. However, the authentication state 311 and secure messaging state 314 are required to fulfill the composite security access control rule CAC02 313 shown in FIG. 2C, before processing with the security to token is permitted. In the non-local registry embodiment of the invention, the authentication 311 and secure messaging states 314 are received from the token's security domain control application (SDCA) 182 and stored in either volatile memory or in a temporary file.

In either embodiment of the invention, the TACA 142 causes the PIN application 122 to execute 325 which causes a graphic user interface (GUI) to be displayed which requires a users credential input, in this case a PIN 330. The user enters his or her PIN 330 which is returned 335 to the PIN agent 156 via the TACA 142.

The PIN agent 156 routes 340 the PIN 330 to its counterpart token PIN application 186 for processing. Upon successful authentication by the token PIN application 186, the PIN agent 156 is notified of the successful authentication 340 and a state is updated 345 in the registry maintained by the SDCA 182.

In the local registry embodiment of the invention an analogous process occurs where upon receipt of the successful authentication notification, the PIN agent 156 updates the authentication state 270 of the registry 205 maintained by the TACA 142. In the non-local registry embodiment of the invention, processing continues without this step.

In either embodiment of the invention, an unsuccessful authentication by the token PIN application 186 would return an access denied response to the PIN agent 156 which terminates the signing transaction.

Upon successful completion of the authentication, the TACA 142 signals 350 the secure messaging agent SM 166 to establish a secure messaging session using the token secure messaging application SM1 192. The secure messaging agent 166 causes the secure messaging application SM1 192 to establish a secure messaging session in accordance with the combined security policy CAC02 313.

Analogously, upon successfully establishing a secure messaging session by the token secure messaging application SM1 192, the secure messaging agent 166 is notified of the successful session 355 and a state is updated 360 in a registry maintained by the SDCA 182. In the registry embodiment of the invention, upon receipt of the successful secure messaging establishment notification, the secure messaging agent 166 updates the secure messaging session state 290 of the registry 205 maintained by the TACA 142. In the non-local registry version of the invention, processing continues without performing this step.

In either embodiment of the invention, an unsuccessful secure messaging session establishment by the token secure messaging application 192 would return an access denied response to the secure messaging agent 166 which terminates the signing transaction.

Upon establishment of the secure messaging session, the TACA 142 signals 365 the requesting application 118 to transfer the object 305 to be signed. The TACA 142 forwards 370 the object 305 to the PKI agent 168 for signing by the token PKI application 194. The object 305 is sent 375 to the token PKI application 194 where it is signed and returned 385 to the PKI agent 168.

The signed object 305A is sent 390 by the PKI agent 168 to the TACA 142 where it is returned 395 to the requesting application 118.

Figure 3A:
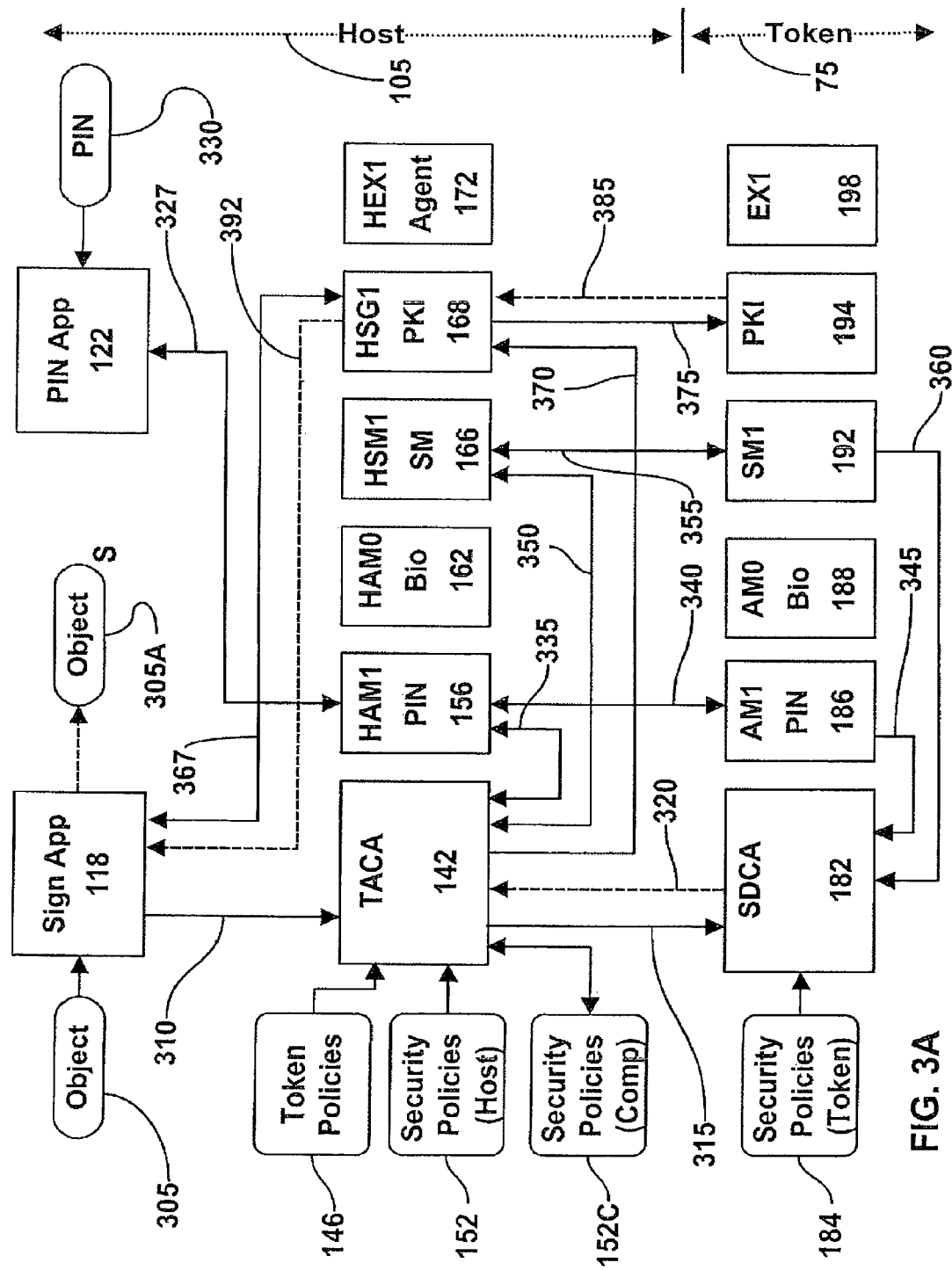
FIG. 3A—is a detailed block diagram illustrating a second embodiment of the invention.

Referring to FIG. 3A, another embodiment of the invention is illustrated and continues with the previous example. In this embodiment of the invention, the TACA 142 receives a request 310 from a requesting application 118. As before, the requesting application 118 sends a request 310 to the token access control application (TACA) 40 which causes the TACA to request 315 the token security policies 184 from the token's security domain control application (SDCA) 182. The token security policies are returned 320 to the TACA 142 and logically combined with the host security policies 152 resulting in the set of composite security policies 152C. In an alternate embodiment of the invention, information related to the required counterpart security application agents is returned as well for verification and if necessary installation. The authentication, enablement, secure messaging states and token selection are verified as before.

However, in this embodiment of the invention, the TACA 142 extracts the applicable portions of the composite security policies for signing the object 305 and forwards 335, 350 the applicable security policies onto the PIN agent 156 and secure messaging agent 166 which enforce their portion of the forwarded composite security policies. In this embodiment of the invention, the PIN agent 156 causes 327 the PIN application 122 to execute.

The entered PIN 330 is then sent directly 327 to the PIN agent 156 where processing of the PIN 330 by the token PIN application 186 and the updating of registry information, if applicable to the embodiment of the invention, is performed as previously described.

The successful completion of the authentication transaction causes the TACA 142 to forward the applicable security policies associated with secure messaging to the secure messaging agent 166. The secure messaging agent 166 causes the secure messaging application SM1 192 to establish a secure messaging session in accordance with the applicable portion of the composite security policy. Establishment of a secure messaging session and updating of registry entries is performed, if applicable to the embodiment of the invention, as previously described.

Once the required security policies have been achieved, the TACA 142 signals 370 the PKI agent 168 to process the object 305 to be signed. The PKI agent 168 signals the requesting application 118 to send 367 the object 305. The object 305 is sent by the requesting application 118 to the PKI agent 168 where it is transferred 375 to the token PKI application 194, signed and returned 385 to the PKI agent 168. In this embodiment of the invention, the PKI agent 168 returns 392 the signed object 305A directly to the requesting application.

Figure 3B:
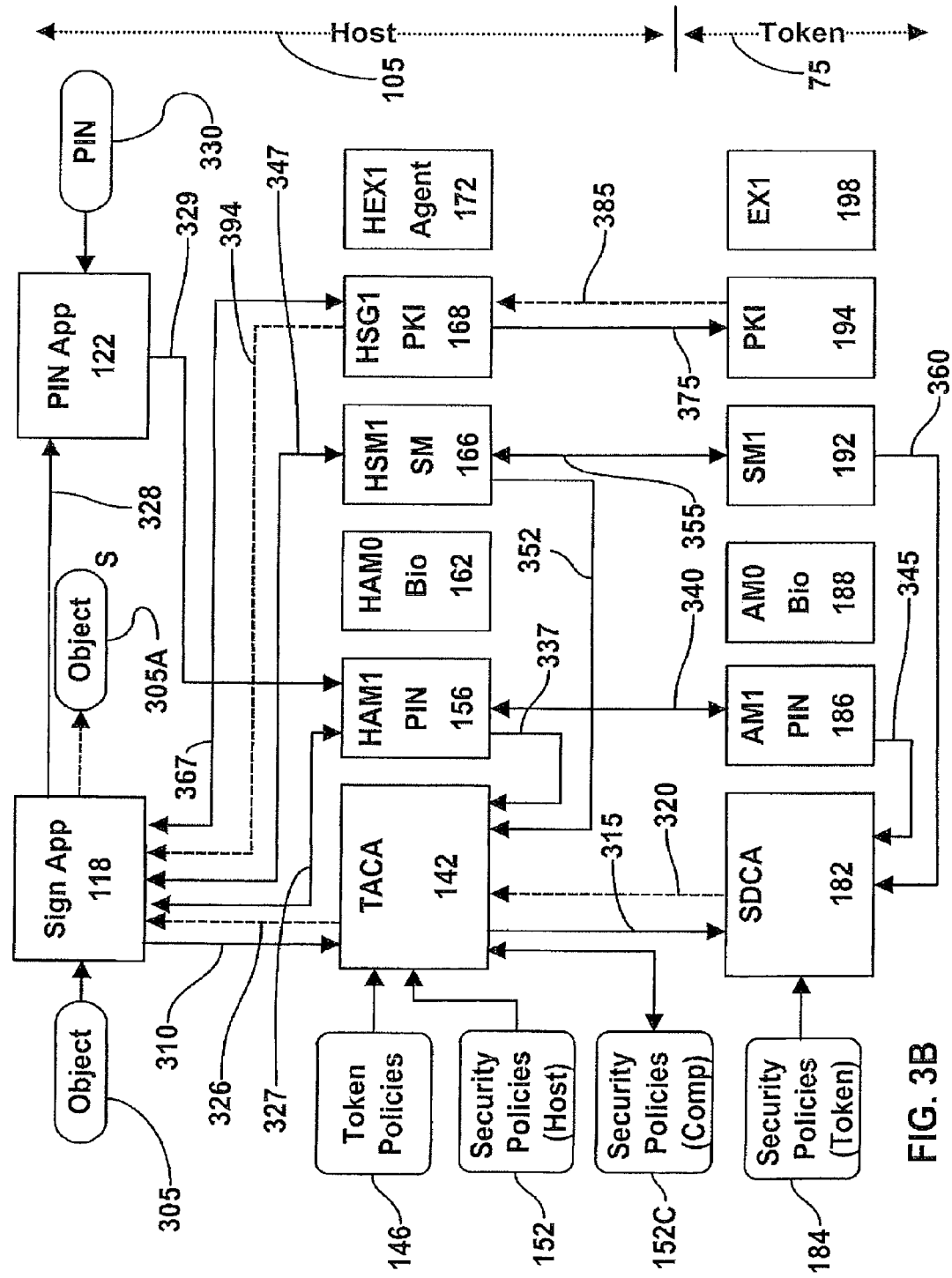
FIG. 3B—is a detailed block diagram illustrating a third embodiment of the invention.

Referring to FIG. 3B, a third embodiment of the invention is illustrated and again continues with the previous example. In this embodiment of the invention, the TACA 142 receives a request 310 from a requesting application 118.

As before, the requesting application 118 sends a request 310 to the token access control application (TACA) 142 which causes the TACA to request 315 the token security policies 184 from the token's security domain control application (SDCA) 182 and retrieves the token policies 146 for proper token selection.

The token security policies are returned 320 to the TACA 142 and logically combined with the host security policies 152 resulting in the set of composite security policies 152C. In an alternate embodiment of the invention, information related to the required counterpart security application agents is returned as well for verification and if necessary installation. The authentication, enablement, secure messaging parameters and token selection are again verified as before, if applicable to the embodiment of the invention.

In this embodiment of the invention, the TACA 142 forwards 326 the applicable portion of the security policy to the requesting application 118. The requesting application 118 becomes responsible for implementing the composite set of security policies. The requesting application signals the PIN agent 327 and causes 328 the PEN application 122 to execute. The PIN 330 is sent directly 329 to the PIN agent 156 where processing of the PIN 330 by the token PIN application 186 and the updating of registry information, if applicable to the embodiment of the invention, is performed as previously described. The PIN agent 156 signals 327 the requesting application 118 of the successful completion of the authentication transaction.

The requesting application 118 then signals 347 the secure messaging agent 166 to establish a secure messaging session. The secure messaging agent 166 causes the secure messaging application SM1 192 to establish a secure messaging session in accordance with the applicable portion of the composite security policy. Establishment of a secure messaging session and updating of registry entries, if applicable to the embodiment of the invention, is performed as previously described.

The secure messaging agent 166 signals 347 the requesting application that a secure messaging session is established. The requesting application 118 then signals 367 the PKI agent 168 to receive the object 305 to be signed. The object 305 is sent by the requesting application 118 to the PKI agent 168 where it is transferred 375 to the token PKI application, signed and returned 385 to the PKI agent 168. In this embodiment of the invention, the PKI agent 168 again returns 394 the signed object 305A directly to the requesting application.

Figure 4:
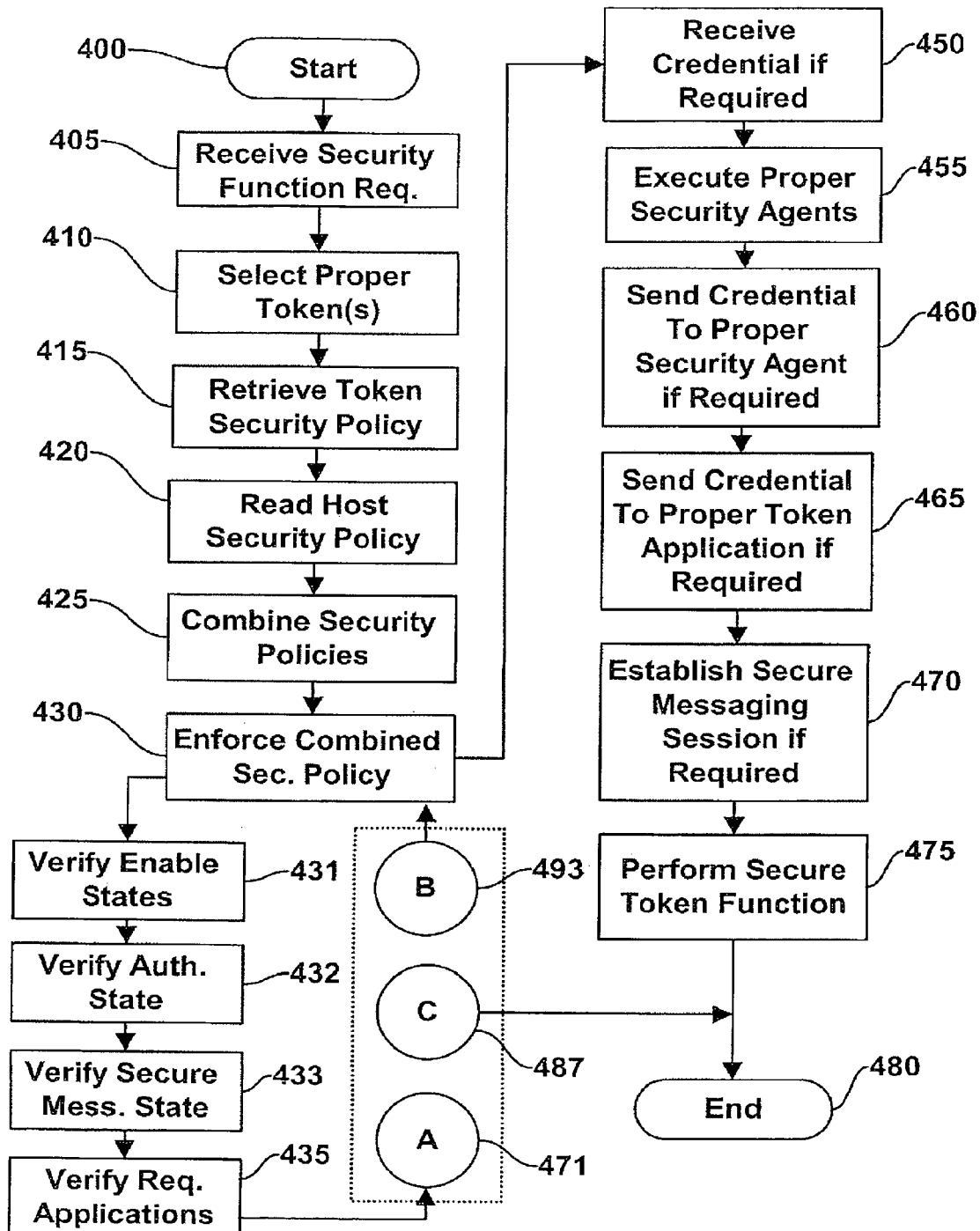
FIG. 4—is a flow diagram illustrating the major steps necessary to implement the first embodiment of the invention.

Referring to FIG. 4, the steps required for implementing the invention are depicted. The sequence is initiated 400 by receiving a request to perform a security function using a security token from an application by a token access control application (TACA) 405. The TACA retrieves the token policy and selects the proper security token(s) to implement the transaction 410. The TACA then retrieves a token security policy 415 from the selected security token(s), reads the host security policy 420 and generates a composite set of security policies 425 from the logical combination of the token and host security policies.

The TACA ensure enforcement of the security policies 430 in one embodiment of the invention by accessing a registry comprising security parameters for verifying a set of enablement states in a registry 431, verifying an authentication state in a registry 432, verifying a secure messaging state in the registry 433 and verifying that the required security agent and/or counterpart security application are compatible 435. The discussion of compatibility verification between token security applications and host security application agents is provided under FIG. 4C below. The compatibility verification process is initiated at step A 471 and if compatibility is established between the token security applications and host security application agents at step B 493 processing continues by enforcement of the combined security policies 430. If compatibility is not established between the token security applications and host security application agents at step C 487, processing ends 480.

In another embodiment of the invention, the security policy is enforced without verifying security parameters (non-local registry embodiment) and continues by receiving a specific credential, if required 450, causing the execution of one or more appropriate security agents 455, sending the received credential to the appropriate security agent, if required 460, sending the received credential to the proper token application 465, establishing a secure messaging session, if required 470, performing a security function 475 and ending processing 480 after performing the security function.

Figure 4A:
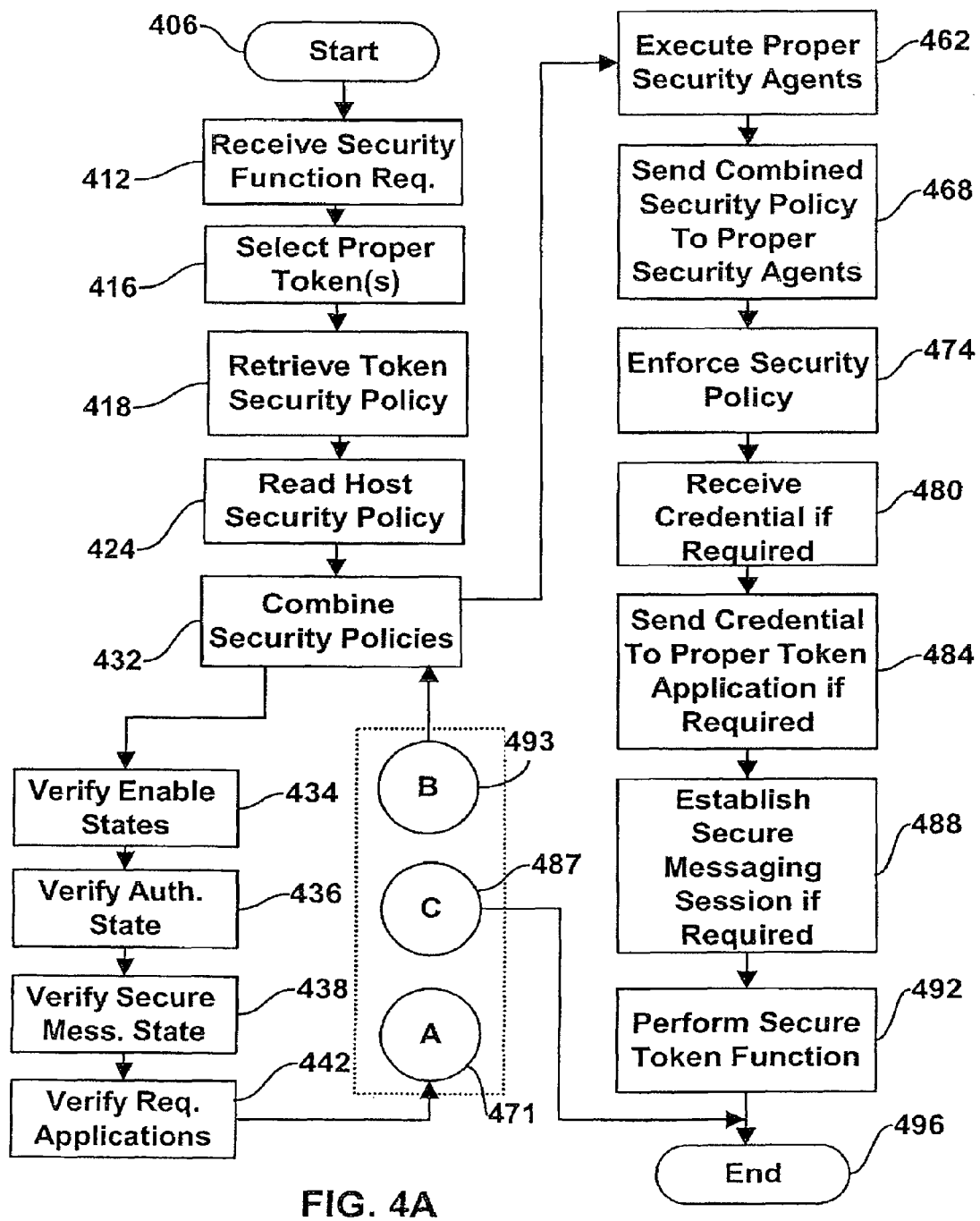
FIG. 4A—is a flow diagram illustrating the major steps necessary to implement the second embodiment of the invention.

Referring to FIG. 4A, the steps required for implementing another embodiment of the invention are depicted. The sequence is initiated 406 by receiving a request to perform a security function using a security token from an application by a token access control application (TACA) 412. The TACA retrieves a token selection policy 418 and selects the security tokens to perform the security transactions. The TACA then retrieves a token security policy 418 from the selected security token(s), reads an associated host security policy 424 and generates a composite security policy 432 from the logical combination of the token and host security policies.

In one embodiment of the invention, the TACA accesses a registry comprising security parameters for verifying a set of enablement states in the registry 434, verifying an authentication state in the registry 436, verifying a secure messaging state in the registry 438 and verifying that the required security agent and/or counterpart security application are compatible 442. The compatibility verification process is initiated at step A 471 and if compatibility is established between the token security applications and host security application agents at step B 493 processing continues by enforcement of the combined security policies 432. If compatibility is not established between the token security applications and host security application agents at step C 487, processing ends 496. Otherwise 448, processing continues by enforcement of the combined security policies 432.

In another embodiment of the invention, the security policy is enforced without verifying security parameters (non-local registry embodiment) and continues by executing the appropriate security application agents 462, sending the combined set of security policies to the appropriate security application agents 468, ensuring enforcement of the composite set of security policies by the appropriate security agents 474, receiving a specific credential, if required 480, sending the received credential to the proper token application, if required 484, establishing a secure messaging session, if required 488, performing a security function 492 and ending processing 496 after performing the security function.

Figure 4B:
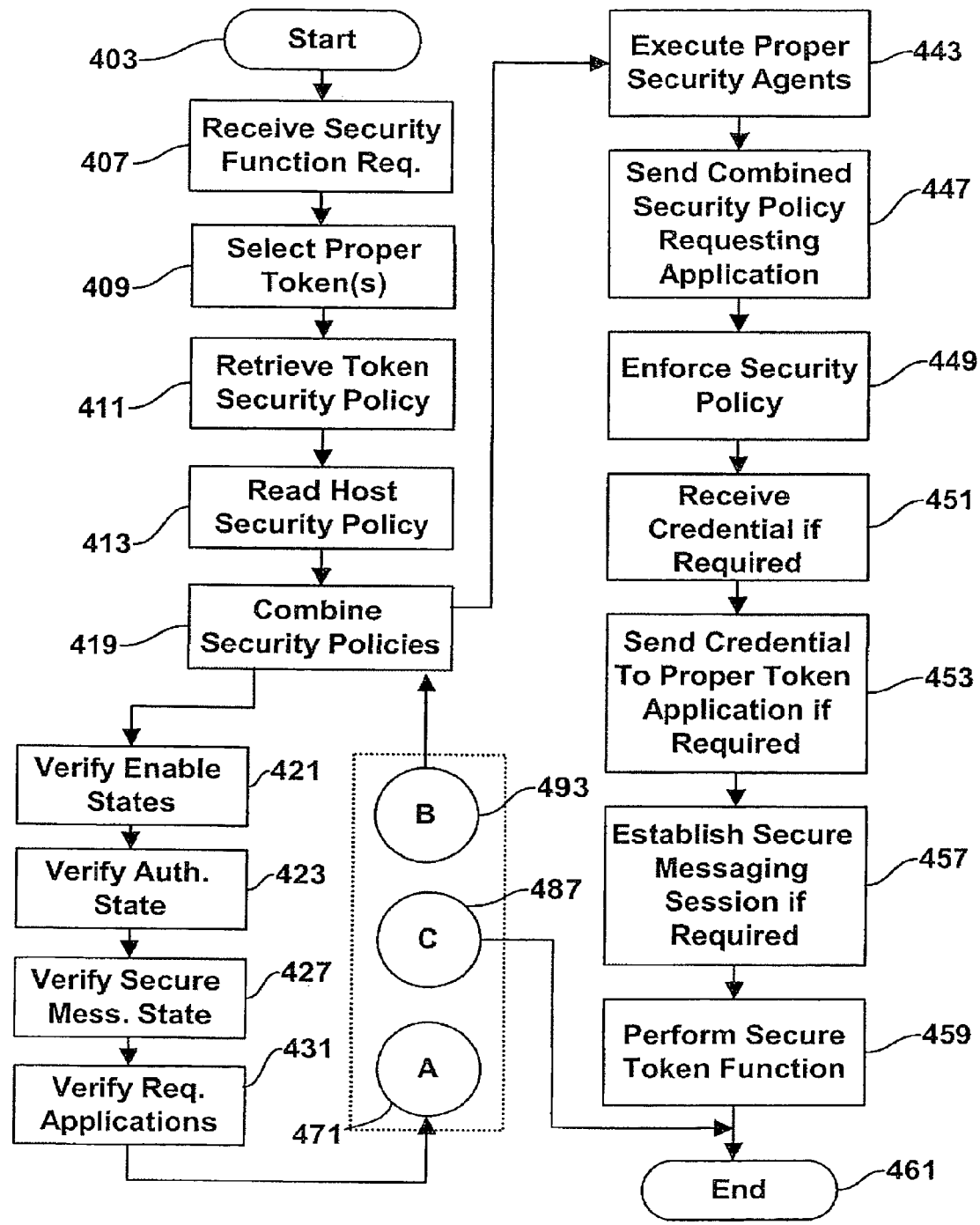
FIG. 4B—is a flow diagram illustrating the major steps necessary to implement the third embodiment of the invention.

Referring to FIG. 4B, the steps required for implementing the yet another embodiment of the invention are depicted. The sequence is initiated 403 by receiving a request to perform a security function using a security token from an application by a token access control application (TACA) 407. The TACA retrieves token policies and selects the proper security token(s) to perform the transaction 409. The TACA then retrieves a token security policy 409 from the selected security token(s), retrieves the host security policy 413 and generates a composite security policy 419 from the logical combination of the token and host security policies.

In one embodiment of the invention, the TACA accesses a registry comprising security parameters for verifying a set of enablement states in the registry 421, verifying an authentication state in the registry 423, verifying a secure messaging state in the registry 427 and verifying that the required security agent and/or counterpart security application are compatible 431 The compatibility verification process is initiated at step A 471 and if compatibility is established between the token security applications and host security application agents at step B 493 processing continues by enforcement of the combined security policies 430.

If compatibility is not established between the token security applications and host security application agents at step C 487, processing ends 480. Otherwise 439, processing continues by enforcement of the combined security policies 419.

In another embodiment of the invention (non-local registry embodiment), the security policy is enforced without verifying security parameters and continues by executing the appropriate security agents 443, sending the combined security policy to the requesting application 447, ensuring enforcement of the security policy by the appropriate security agents 449, receiving a specific credential, if required 451, sending the received credential to the proper token application, if required 453, establishing a secure messaging session, if required 457, performing a security function 459 and ending processing 461 after performing the security function.

Figure 4C:
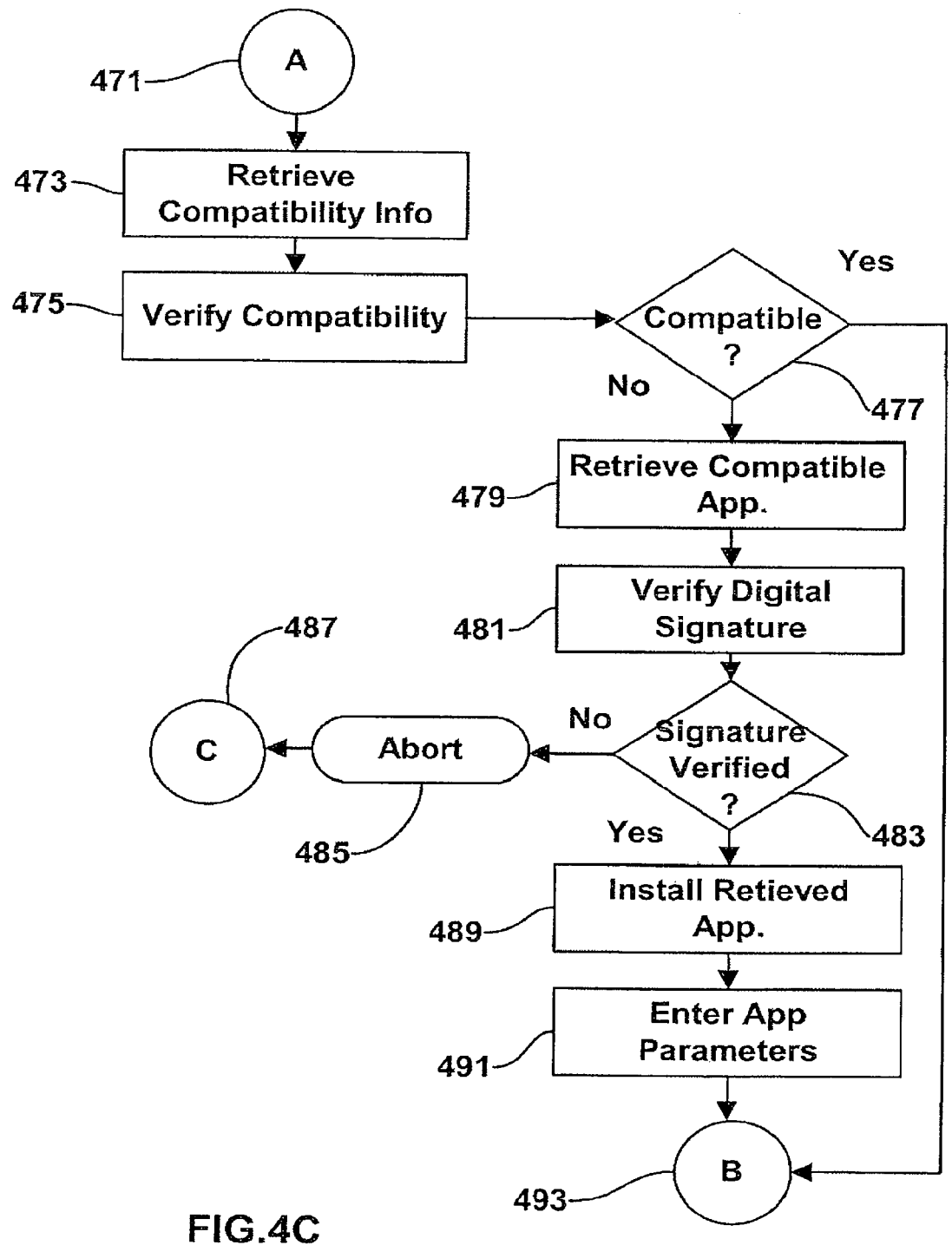
FIG. 4C—is a flow diagram illustrating the major steps necessary to retrieve compatibility information from the security token to the host computer system.

Referring to FIG. 4C, the steps required to retrieve compatibility information from the compliant security token to the host computer system is depicted. The compatibility information ensures that the proper version of security application agent is installed on the host computer system in order to properly operate with their counterpart token security applications. The process is initiated at step A 471 by retrieving the compatibility information from the security token 473. The information may be retrieved from a registry maintained by the security domain control application installed inside the security token or provided directly by each of the token security applications.

The retrieved compatibility information is then used to verify that the installed host security application agents are compatible with the installed token security applications 475. If the security application agents are compatible with token security applications 477, this portion of the processing ends and returns at step B 493.

If one or more of the security application agents are not compatible with one or more of the token security applications 477, one or more compatible security application agents are retrieved 479. The security application agent(s) may be retrieved from either a local or remote storage location. A digital signature verification is then performed 481.

If the digital signature(s) are not verified 483, the installation process is aborted 485 and processing terminated at step C 487. If the digital signature(s) are verified 483, the retrieved application(s) are installed on the host computer system 489. The newly installed security application agent(s) are then registered with either the host operating system or token access control application by entry of parameters in a registry 491. Once the appropriate registry has been updated with the parameters, processing is completed at step B 493.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the Claims following herein.

What is claimed is:

1. A non-transitory computer-readable medium containing software that implements a security system, the software comprising: executable code that retrieves token security policies from a compliant security token; and executable code that enforces the set of security policies when the compliant security token is used to perform a security function, wherein a host computer has retrievable host security policies, token selection policies, and a token access control application that generates a combined set of security policies using the host security policies, the token selection policies, and the token security policies and that ensures enforcement of the combined set of security policies, wherein the token selection policies include rules that indicate choice of the compliant security token.

2. A non-transitory computer-readable medium, according to claim 1, wherein at least a portion of the host security policies are retrieved from the host computer system.

3. A non-transitory computer-readable medium, according to claim 1, wherein at least a portion of the token security policies are retrieved from the security token.

4. A non-transitory computer-readable medium, according to claim 1, wherein at least one security application agent and the token access control application are provided with the security token and wherein the at least one security application agent performs a security function for the token security applications in accordance with the combined security policies.

5. A non-transitory computer-readable medium, according to claim 4, wherein in response to receiving an object from an other application, the at least one security application agent returns the object to the other application after the at least one security application agent and the token security application have performed the security function.

6. A non-transitory computer-readable medium, according to claim 5, wherein the at least one security application agent returns the object to the token access control application after performing the security function with the one or more token security applications.

7. A non-transitory computer-readable medium, according to claim 5, wherein the object includes at least one of: a digital certificate, data to undergo a cryptographic function, and data to be stored in the security token.

8. A non-transitory computer-readable medium, according to claim 4, wherein the security function includes authentication using a credential.

9. A non-transitory computer-readable medium, according to claim 8, wherein the credential includes at least one of: a personal identification number, a password and a biometric sample.

10. A non-transitory computer-readable medium, according to claim 8, wherein the security function further includes establishing a secure messaging session.

11. A non-transitory computer-readable medium, according to claim 4, wherein said one or more token security applications includes an authentication application.

12. A non-transitory computer-readable medium, according to claim 11, wherein said one or more token security applications further includes a secure messaging application.

13. A non-transitory computer-readable medium, according to claim 12, wherein the host computer system stores the combined security policies.

14. A non-transitory computer-readable medium, according to claim 12, wherein the host security policies include at least one host access control rule.

15. A non-transitory computer-readable medium, according to claim 14, wherein the token security policies include at least one token access control rule.

16. A non-transitory computer-readable medium, according to claim 15, wherein the combined security policies are generated from a most restrictive logical combination of the at least one host access control rule and the at least one token access control rule by the token access control application.

17. A non-transitory computer-readable medium, according to claim 16, wherein the host security policies further include token selection rules.

18. A non-transitory computer-readable medium, according to claim 1, wherein the token access control application further includes a registry.

19. A non-transitory computer-readable medium, according to claim 18, wherein the registry includes a plurality of security parameters associated with at least one registered token security application, at least one registered security agent application, at least one enablement flag and at least one operational state.

20. A non-transitory computer-readable medium containing software that implements a security system, the software comprising: executable code that retrieves token security policies from a compliant security token; and executable code that enforces the set of security policies when the compliant security token is used to perform a security function, wherein a host computer has retrievable host security policies and token selection policies that are separate from the token security policies and a token access control application that generates a combined set of security policies by combining the host security policies, the token selection policies, and the token security policies and that ensures enforcement of the combined set of security policies, wherein the token selection policies include rules that indicate choice of the compliant security token.

* * * * *